Nov. 20, 1951  C. D. HIRST ET AL  2,575,810
VALVE FOR METERING SYSTEM

Filed Feb. 14, 1947  3 Sheets-Sheet 1

INVENTORS
Charles D. Hirst
BY George L. Woodington

Mellin & Hanscom
ATTORNEYS

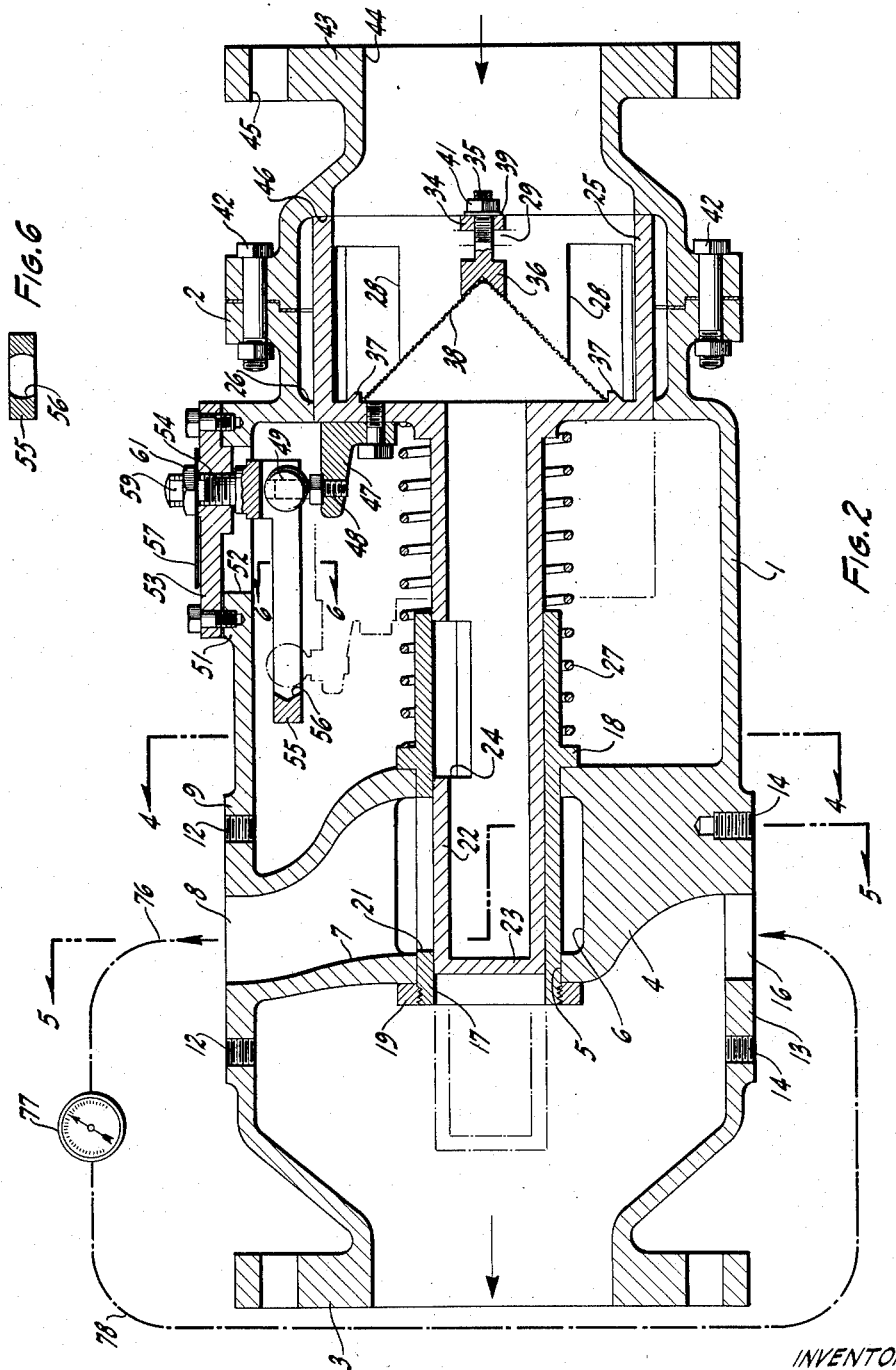

Nov. 20, 1951 — C. D. HIRST ET AL — 2,575,810
VALVE FOR METERING SYSTEM
Filed Feb. 14, 1947 — 3 Sheets-Sheet 3
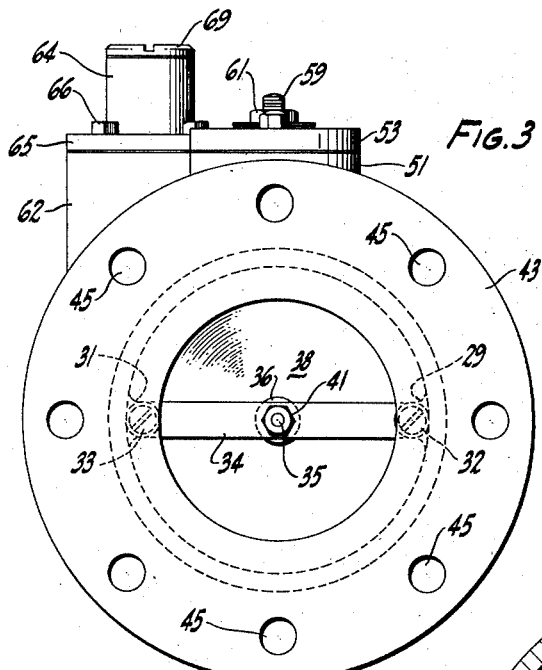
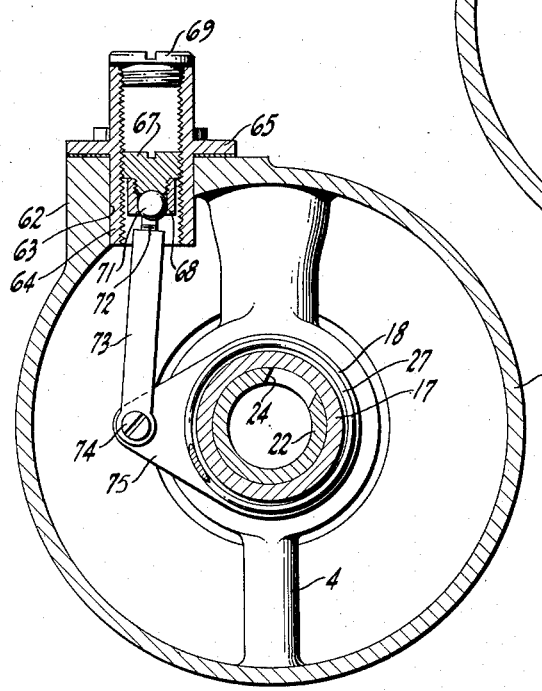
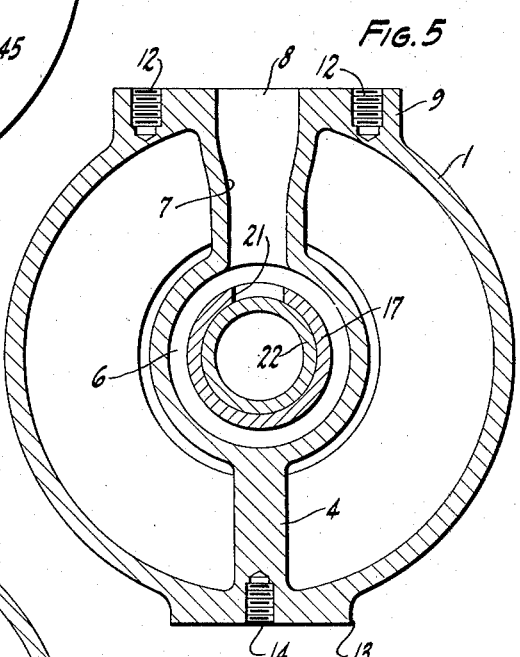
INVENTORS
Charles D. Hirst
George L. Woodington
BY Mellin + Hanscom
ATTORNEYS // Patented Nov. 20, 1951

UNITED STATES PATENT OFFICE 2,575,810

VALVE FOR METERING SYSTEM

Charles D. Hirst, Cupertino, and George L. Woodington, North Sacramento, Calif.; said George L. Woodington assignor by decree of distribution to Vera J. Woodington, North Sacramento, Calif.

Application February 14, 1947, Serial No. 728,690

4 Claims. (Cl. 277—24)

This invention relates to a liquid metering system or proportioning compound meter, and has for its object the provision of a system including a main meter in circuit with a positive displacement by-pass or measuring meter and wherein the main meter is provided with a compound valve for shunting to the by-pass meter a predetermined proportion of the total flow through the main meter.

A further object of this invention is the provision of a main meter provided with a pair of spring loaded valves arranged in tandem, one of said valves being arranged to control the total flow through the device and the other being arranged to permit a predetermined fraction of the total flow to be shunted to a by-pass meter associated therewith.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Fig. 2 is a longitudinal mid-section taken through the meter illustrated in Fig. 1 and diagrammatically showing its connection with a by-pass meter.

Fig. 3 is a rear end elevation of the meter shown in Fig. 1.

Fig. 4 is a section taken on the line 4—4 of Fig. 2.

Fig. 5 is a section taken on the line 5—5 of Fig. 2.

Fig. 6 is a section taken on the line 6—6 of Fig. 2.

Figure 1:
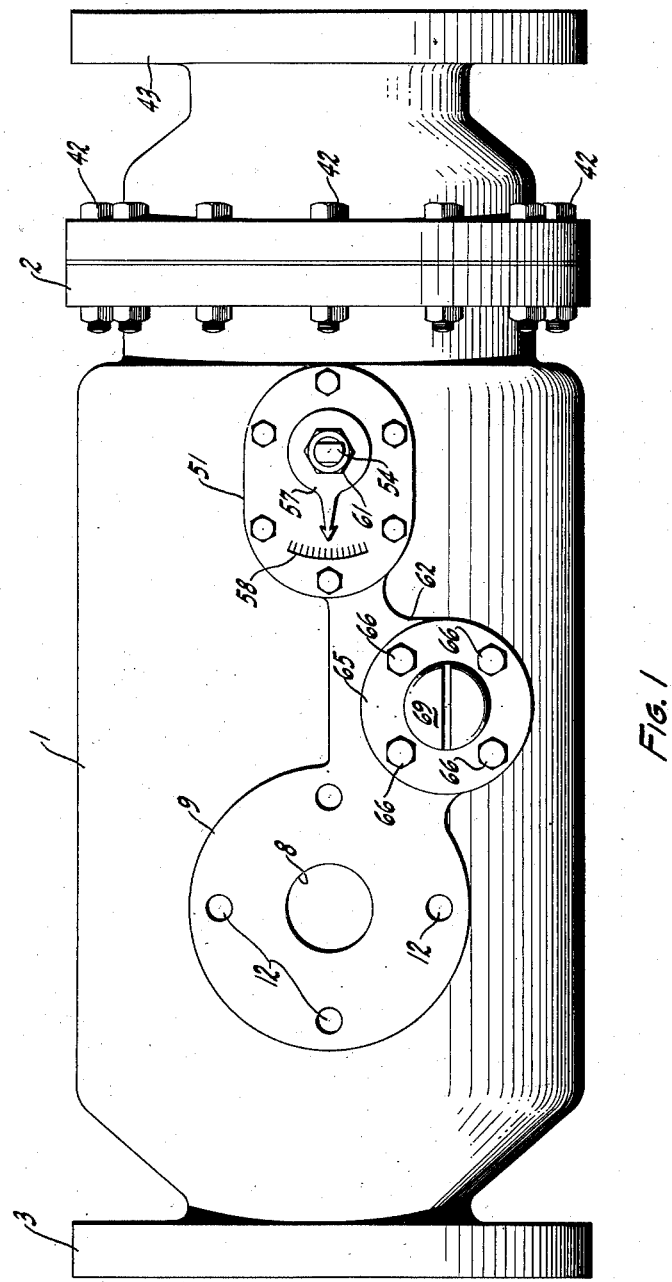
Fig. 1 is a top plan view of the main meter embodying the objects of our invention.

As shown in these various figures, our main meter includes a generally cylindrical body 1 provided with a flanged intake connection 2 and with a flanged discharge connection 3. Formed intermediate the ends of the casing 1 is a transverse member 4 formed with a bore 5 coaxial with the axis of the body 1, with an annular channel 6 at its upper end with a conduit 7 terminating in a port 8. The port 8 extends through a boss 9 formed on the periphery of the body 1 and which is provided with threaded bolt holes 12. Formed in the lower side of the casing 1 is a boss 13 provided with threaded bolt holes 14 and with an inlet 16 diametrically opposed to the port 8. Seated within the bore 5 is a sleeve 17 formed intermediate its ends with a flange 18 arranged to abut the inner face of the transverse member 4. Threaded to the outer end of the sleeve 17 is a locking nut 19 which with the flange 18 serves to fix the sleeve 17 on the cross-member 4. Formed in the upper wall of the sleeve 17 is a rectangular port 21 registering with the lower end of the conduit 7.

Slidably disposed within the sleeve 17 is a hollow stem 22 closed at its forward end by end wall 23 and formed on its upper periphery with a rectangular port 24 arranged to register progressively with the port 21 of the sleeve 17 as a result of the longitudinal and/or rotary movement of the stem 22.

Formed as a continuation of the open rear end of the stem 22 is a cup-shaped piston 25, the outer periphery of which has a close clearance with an internal flange 26 formed in the body 1 and which defines an intake port therefor. Disposed between the flange 18 of the sleeve 17 and the forward face of the piston 25 is a coil spring 27 for opposing the forward movement of the piston 25 to a degree correlated with the pressure required to operate the by-pass meter with which our main meter is designed to operate and which presently will be more fully explained. Formed on the peripheral walls of the piston 25 are a plurality of rectangular ports 28 for establishing communication between the exterior and interior thereof. Extending inwardly from the rear end of the piston 25 and formed as an integral part thereof are a pair of diametrically disposed lugs 29 and 31, and fastened to these lugs by screws 32, 33, is a cross-bar 34. Threaded through the cross-bar 34 on the axis of the body 1 is a screw 35 provided at its inner end with a conical screen retainer 36. Extending inwardly from the outer face of the piston 25 are a plurality of screen-retaining lugs 37 arranged in a ring coaxial with the axis of the body 1. Disposed over the outer face of the piston 25 within the lugs 37 is a conical screen 38, this screen being locked against the piston by the conical retainer 36. Threaded over the outer end of the screw 35 are a lock washer 39 and a lock nut 41.

Fastened to the flange 2 of the body 1 by bolts 42 is a body adapter or fitting 43 formed with a central intake opening 44 and with threaded bores 45. The flanged discharge connection 3 and the body adapter 43 therefore serve as a means by which our main meter may be spliced in a pipeline. Intermediate its ends the body adapter 43 is provided with an annular shoulder 46 serving to limit the rearward movement of the piston 25.

Bolted to the forward face of the piston 25 is a bracket 47, and carried on the forwardly extending arm of this bracket is an upstanding pin 48. Journalled on the upper end of this pin is a follower ball 49. Formed on the upper wall of the body 1 adjacent its rear end is a boss 51 surrounding an opening 52. Bolted over the boss 51 is a cover plate 53, and threaded into this cover plate is a screw 54. Formed integral with the lower end of the screw 54 and extending generally forward is an arm 55 formed with a longitudinally extending undercut slot 56 defining a track within which the follower ball 49 is arranged to travel. The rear end of the slot 56 is open so that the follower ball 49 may be inserted within the slot during the assembly of this portion of the device. Keyed to the screw 54 is a pointer 57 arranged to sweep over a graduated scale 58 inscribed in the upper face of the cover plate 53. The upper end of the screw 54 is formed with suitable wrench faces 59 by which it may be turned so as to adjust the angular position of the arm 55 with respect to the longitudinal axis of the body 1. Threaded over the upper end of the screw 54 is a lock nut 61 for locking the arm 55 in any predetermined angular position.

Formed on the upper side of the body 1 is a boss 62 provided with a bore 63. Extending snugly through this bore is an internally threaded nipple 64 provided intermediate its ends with a flange 65 arranged to seat on the upper face of the boss 62. The nipple 64 is fastened in place by screws 66 threaded through the flange 65 into the boss 62. Threaded within the nipple 64 is a screw 67 and threaded to the lower end of this screw is a ball socket 68. Mounted on the upper end of the nipple 64 is a screw plug 69 serving to seal the entire assembly from the external atmosphere. Seated in the socket 68 is a ball 71 carried on the upper end of a screw 72 and threaded to the lower end of the screw 72 is a downwardly extending link 73. The lower end of this link is pivoted by a screw 74 to a radially extending arm 75 formed as an integral part of the flange 18 of the sleeve 17. By adjusting the vertical position of the screw 67 within the nipple 64, the angular position of the port 21 with respect to the port 24 can be adjusted as desired to thereby limit the maximum registration of these two ports.

In passing it should be observed that seal rings or gaskets should be used wherever necessary to effect a liquid tight seal, all in accordance with well-known practice.

As diagrammatically illustrated in Fig. 2, the port 8 of the conduit 7 is connected through a line 76 with one side of a positive displacement by-pass meter 77, the other side of the meter being connected through a line 78 with the port 16 of the body 1. If the meter 77 is of such a type that it will not operate under a pressure less than say 4 lbs. per sq. in. pressure at its maximum capacity, the differential pressure between the fluid entering the valve and that exerted by the spring should be in excess of 4 lbs.

The valve thus described is adjusted so as to maintain the desired ratio of flows through the valve body and through the meter by presetting the angular position of port 21 and the angular position of the arm 55.

In the operation of a system of this type water flows through the body adapter 43 and into the piston 25 and its associated stem 22. If the fluid pressure is greater than the pressure exerted by the spring 27, the piston 25 and the stem 22 will move forwardly, thereby causing the ports 28 of the piston 25 to straddle the flange 26, and causing the port 24 of the stem 22 to come into partial or full registration with the port 21 formed in the sleeve 17. If the arm 55 is set parallel with the axis of the valve body 1, the degree of registration of the ports 21 and 24, and the total area of the opening defined thereby, will depend entirely on the axial position of the port 24 with respect to the port 21. This area therefore increases in direct proportion to the downstream travel of the stem 22. We have found, however, that when this relationship is maintained, the proportion between the flow shunted to the meter and the total flow through the main meter will increase with the downstream movement of the stem 22. To compensate for this and to maintain a constant ratio of flows through the two meters it is necessary to decrease the rate at which the size of the opening defined by the ports 21 and 24 is increasing in response to the downstream movement of the stem 22. This is accomplished by setting the arm 55 at an angle so that the downstream movement of the stem 22 will be accompanied by a limited rotation thereof to thereby progressively decrease the width of the opening in question. The exact setting of the arm 55 to obtain any desired proportion of flows is of course determined by actual trial prior to the installation of the main meter at the time that the scale 58 is calibrated. Within the limits of the device any desired ratio of flows can be obtained by simply rotating the screw 54 so that the pointer 57 registers with the corresponding ratio indicated on the scale 58 without the necessity of removing the main meter from the line or of in any other way disturbing it. Conveniently, the width and length of the ports 21 and 24, and the extent to which the stem 22 is made to rotate through the action of the follower ball 49 in travelling within the slot 56, can be so correlated that $\frac{1}{20}$ or any other desired proportion of the total flow through the main meter can be shunted through the meter 77. The meter is of course calibrated so as to read in terms of the total flow through the main meter rather than the actual flow through the meter.

In passing, it should be observed that the discharge from the meter can be returned to either the discharge side of the main meter or it can be discharged to waste or returned to the upper end of an open storage tank communicating with the main meter intake. The meter discharge cannot be returned directly to the intake side of the main meter, for, in such event, the meter would be subjected to a static pressure. If it be assumed that the pressure of the liquid on the intake side of the main meter is 10 lbs. per sq. in., that the spring 27 produces an initial restraining pressure of 5 lbs. per sq. in., and that the meter requires an operating pressure of 4 lbs. per sq. in. at maximum capacity, the actual pressure on the meter will be found to be 5 lbs. per sq. in., or one pound per square inch in excess of the theoretical pressure required to actuate the meter. Since the pressure at the discharge end of the main meter would then be 5 lbs., the meter discharge can be safely recirculated to the discharge side of the main meter, as indicated in Fig. 2.

From the above description it will be seen that we have provided a relatively simple system or compound proportioning meter for indicating the flow through a pipe-line as well as a main meter forming a part of such a system.

We claim:

1. A valve of the character described comprising: a generally cylindrical body provided at one end with an intake port and at its opposite end with a first discharge outlet; a sleeve supported within said body coaxial therewith and formed on one side with an outlet port communicating through a radial conduit with a second discharge outlet formed in said body; a hollow stem snugly and slidably disposed in said sleeve, said stem being formed on one side with a discharge port arranged upon sliding movement thereof to register with the outlet port in said sleeve; a closure member carried on said stem for opening and closing the intake port of said body, said closure member and the discharge port of said sleeve being so positioned relative to each other that when the intake port of said body is closed by said closure member the discharge port of said stem will be out of registration with the discharge port of said sleeve; means for resiliently urging said stem to its closed position and means for rotating said stem through a predetermined angle in response to a downstream movement thereof.

2. A valve of the character described comprising: a generally cyindrical body provided at one end with an intake port and at its opposite end with a discharge outlet; an open ended radial conduit mounted within said body intermediate its ends; a sleeve mounted within said body coaxially therewith and provided on a side thereof with an outlet port in registration with the inner end of said radial conduit; a hollow stem snugly and slidably disposed in said sleeve, said stem being closed at its downstream end and being provided on one side with a discharge port arranged upon sliding movement thereof to register with the outlet port of said sleeve; a closure member carried on said stem for opening and closing the intake port of said body, said closure member and the discharge port of said sleeve being so positioned relative to each other that when the intake port of said body is closed by said closure member the discharge port of said stem will be out of registration with the discharge port of said sleeve; means for resiliently restraining the opening movement of said stem and means for progressively varying the radial alignment of the port in said stem with respect to the port in said sleeve in response to the longitudinal movement of said stem.

3. A valve of the character described comprising: a generally cylindrical body arranged to be spliced in a pipeline, said body being provided on its upstream end with an intake port and on its downstream end with a discharge outlet; a sleeve mounted within said body coaxially therewith, said sleeve being provided on one side with a discharge port; a conduit mounted within said body in communication at its inner end with the port in said sleeve and in communication at its outer end with an auxiliary discharge port formed in said body; a hollow stem slidably mounted in said sleeve, said stem being closed at its downstream end and provided intermediate its ends with a discharge port arranged progressively to register with the port in said sleeve in response to the axial and rotary movement of said stem; a cup-shaped piston mounted on the upstream end of said stem in communication therewith, said piston in its upstream limiting position being arranged to close the intake port in said body and being provided on its side walls with ports arranged to straddle the walls of said intake port upon the downstream movement of said stem; means for resiliently restraining the downstream movement of said stem; a track and track follower operatively associated with said stem and body for causing said stem to rotate in response to the longitudinal movement thereof, and means external to said body for adjusting the angular position of said track relative to the axis of said body.

4. A valve of the character described comprising: a generally cylindrical body provided at one end with an intake port and at its opposite end with a first discharge outlet; a sleeve supported within said body coaxial therewith and formed on one side with an outlet port communicating through a radial conduit with a second discharge outlet formed in said body; means adjustable at a point external to said body for rotating said sleeve; a hollow stem snugly and slidably disposed in said sleeve, said stem being formed on one side with a discharge port arranged upon sliding movement thereof to register with the outlet port in said sleeve; a closure member carried on said stem for opening and closing the intake port of said body, said closure member and the discharge port of said sleeve being so positioned relative to each other that when the intake port of said body is closed by said closure member the discharge port of said stem will be out of registration with the discharge port of said sleeve; means for resiliently urging said stem to its closed position and means for rotating said stem through a predetermined angle in response to the movement thereof to a forward or opening position.

CHARLES D. HIRST.
GEORGE L. WOODINGTON.

REFERENCES CITED

The following references are of record in the file of this patent:

UNITED STATES PATENTS

| Number | Name | Date |
|---|---|---|
| 168,854 | Taylor | Oct. 19, 1875 |
| 940,114 | Anderson | Nov. 16, 1909 |
| 1,247,330 | Roberts | Nov. 20, 1917 |